US012776930B2

(12) United States Patent
Johnson et al.

(10) Patent No.: US 12,776,930 B2
(45) **Date of Patent: *Oct. 27, 2026**

(54) MACHINE, PROGRAM PRODUCT, AND COMPUTER-IMPLEMENTED METHODS FOR A HYBRID COMMAND MANAGEMENT AGGREGATOR

(71) Applicant: Orbit-Matrix, LLC, Clayton, MO (US)

(72) Inventors: Jesse A Johnson, Spring, TX (US); Jose Fernandez, Sunrise, FL (US); Stephen Vowell, Houston, TX (US); Kevin Mayer, Benalillo, NM (US)

(73) Assignee: Orbit-Matrix, LLC, Clayton, MO (US)

( * ) Notice: Subject to any disclaimer, the term of this patent is extended or adjusted under 35 U.S.C. 154(b) by 317 days.

This patent is subject to a terminal disclaimer.

(21) Appl. No.: 18/677,427

(22) Filed: May 29, 2024

(65) Prior Publication Data

US 2024/0313998 A1 Sep. 19, 2024

Related U.S. Application Data

(63) Continuation of application No. 16/746,575, filed on Jan. 17, 2020, now Pat. No. 12,021,659, which is a (Continued)

(51) Int. Cl.
*H04L 12/413* (2006.01)
*H04L 5/00* (2006.01)
(Continued)

(52) U.S. Cl.
CPC .......... *H04L 12/413* (2013.01); *H04L 5/0044* (2013.01); *H04L 12/2816* (2013.01);
(Continued)

(58) Field of Classification Search
None
See application file for complete search history.

(56) References Cited

U.S. PATENT DOCUMENTS 5,283,637 A 2/1994 Goolcharan
5,528,286 A 6/1996 Goolcharan
(Continued)

OTHER PUBLICATIONS

International Search Report of related International Patent Application No. PCT/US10/33163 dated Jul. 13, 2010.

*Primary Examiner* — Un C Cho
*Assistant Examiner* — Alan L Lindenbaum
(74) *Attorney, Agent, or Firm* — ArentFox Schiff LLP

(57) ABSTRACT

A machine, program product, and method for enabling interoperable and low-latency networking among service devices. The machine, program product and methods perform the tasks of automatically matching a data transmission to a plurality of analog device protocols to determine the necessary instructions and transmission media to control the plurality of analog service devices according to the data transmission or to a plurality of digital device protocols to determine the necessary instructions and transmission media to control the plurality of digital service devices according to the data transmission, determining an outgoing transmission media for the incoming data transmission, constructing outgoing data transmissions between any of the analog service devices and any of the digital service devices responsive to the matching of the analog and digital device protocols and the identification of the outgoing transmission media, and dynamically allocating frequency spectrum for data transmissions between any of the service devices.

20 Claims, 10 Drawing Sheets

Related U.S. Application Data continuation of application No. 15/594,134, filed on May 12, 2017, now Pat. No. 10,574,483, which is a continuation of application No. 12/771,358, filed on Apr. 30, 2010, now Pat. No. 9,686,097.

(60) Provisional application No. 61/215,245, filed on Apr. 30, 2009.

(51) Int. Cl.

| | |
|---|---|
| ***H04L 12/28*** | (2006.01) |
| ***H04L 12/64*** | (2006.01) |
| *H04W 72/543* | (2023.01) |

(52) U.S. Cl.

CPC .. *H04L 12/6418* (2013.01); *H04L 2012/6421* (2013.01); *H04W 72/543* (2023.01)

(56) References Cited

U.S. PATENT DOCUMENTS

| | | | | |
|---|---|---|---|---|
| 6,064,422 | A | 5/2000 | Goolcharan | |
| 6,412,989 | B1 | 7/2002 | Hartman et al. | |
| 6,460,182 | B1 | 10/2002 | Buabbud | |
| 6,516,352 | B1 | 2/2003 | Booth et al. | |
| 7,155,134 | B2 | 12/2006 | Azadet | |
| 7,489,732 | B2 | 2/2009 | Cheng | |
| 7,536,291 | B1 * | 5/2009 | Vijayan Retnamma | G06F 11/1458 703/23 |
| 7,848,398 | B2 | 12/2010 | Fernandez | |
| 7,916,777 | B1 | 3/2011 | Johnson et al. | |
| 2003/0210665 | A1 | 11/2003 | Salmenkaita et al. | |
| 2004/0114515 | A1 * | 6/2004 | Kim | H04L 12/6418 370/230 |
| 2005/0238113 | A1 | 10/2005 | Santhoff et al. | |
| 2007/0217414 | A1 | 9/2007 | Berkman et al. | |
| 2007/0245393 | A1 * | 10/2007 | Fernandez | H04N 7/108 725/126 |
| 2008/0045234 | A1 * | 2/2008 | Reed | G01S 5/02525 455/456.1 |
| 2008/0052752 | A1 | 2/2008 | Jeffery | |
| 2008/0129498 | A1 * | 6/2008 | Howarter | G08B 3/10 340/541 |
| 2008/0268838 | A1 | 10/2008 | Zufall et al. | |

* cited by examiner

MACHINE, PROGRAM PRODUCT, AND COMPUTER-IMPLEMENTED METHODS FOR A HYBRID COMMAND MANAGEMENT AGGREGATOR

RELATED APPLICATIONS

This application is a Continuation of U.S. patent application Ser. No. 16/746,575, filed on Jan. 17, 2020, which is a Continuation of U.S. patent application Ser. No. 15/594,134, filed on May 12, 2017, which is a Continuation of U.S. patent application Ser. No. 12/771,358, filed on Apr. 30, 2010, which claims priority to U.S. Provisional Application Ser. No. 61/215,245, entitled "VUTP Hybrid Command Authority" filed on Apr. 30, 2009. The disclosures of the priority applications are incorporated in their entirety herein by reference.

FIELD OF THE INVENTION

The invention relates generally to an automated telecommunication system for transmitting data on a semantic basis over a frequency spectrum having transmission bandwidths that carry signals such as, video, audio, data and other services, and more particularly to a system that provides for the dynamic assignment and management of frequency bands of a communications spectrum over for Information Technology (IT) data transmissions between digital computing data and analog devices over a common telecommunications network.

BACKGROUND OF THE INVENTION

An issue that often arises in communication systems is maintaining sufficient transmission bandwidth to satisfy quality of service ("QoS") requirements. These challenges are accentuated in instances where unshielded twisted pairs telephone lines ("twisted pair links") are employed. Telephone signals rapidly degrade when transmitted over twisted pair links of meaningful length. However, given the existence of twisted pair links in many buildings and communication networks and the cost associated with alternative links and/or retrofitting existing twisted pair links with alternative links, it is desirable to transmit such signals over twisted pair links for a variety of applications, including video communication systems. Accordingly, there is a need for a system that provides a means to use twisted pair links for high data bandwidth applications.

Moreover, given the rise in demand for real-time motion video, high-resolution images, and quality of service requirements or thresholds have increased demand for broadband spectrum, the need is urgent. While existing phone systems nominally pass voice signals between 0.3 and 3.4 kHz, twisted pair links are capable of carrying frequencies well beyond such 3.4 kHz upper limit. In certain twisted pair links, the upper limit can be tens of megahertz, depending on the length and quality of the wire. Previously and currently known technologies have attempted meet bandwidth demands with near-broadband services, such as DSL (Digital Subscriber Line) and related technologies that provide digital data transmission over the wires of a local telephone network. However, DSL employs a "fixed" frequency allocation according to DSL provider specifications. For example, DSL allocates a finite set of frequency bands for uplink and downlink above the 3.4 kHz upper limit. Another problem with DSL is that signals passing over twisted pair links deteriorate rapidly and unevenly across frequency spectrum with increasing length of the twisted pair communication wire. Even wireless installations, such as Wi-Fi and WiMAX (Worldwide Interoperability for Microwave Access) installations, at the end of their transmissions signals, are often required to pass over twisted-pair copper wire, and signals over these twisted-pair links deteriorate rapidly and unevenly across the frequency spectrum relative to increasing the length of the twisted pair communication wire.

Other previously and currently known technologies employ digital services, such as E1/T1, in an attempt to satisfy the aforementioned demands for bandwidth. However, digital services are often cost prohibitive in that they often require additional voltage, wiring, and special equipment at each end of the line and line, and conditioning to prepare for digital-only service.

There has not heretofore been employed a cost effective and efficient method and apparatus for dynamically allocating frequency to meet the above and other needs. Moreover, there has not heretofore been employed a technology that provides for high bandwidth transmissions over twisted pair links presently forming the backbone of the local telephone infrastructure in the United States and other countries.

This issue of maintaining sufficient transmission bandwidth to satisfy quality of service ("QoS") requirements arises specifically in high-bandwidth communication systems having disparate devices with minimal native interoperability. For example, the rapid and uneven deterioration of signals, while tolerable for basic communications and general internet connectivity, are not suitable for sustaining large-scale implementations of disparate systems and services, including, for example, control authority over electronic computing systems, such as IT/data, security systems, content delivery and facilities management. For example, construction and engineering projects built according to previously and currently known technologies usually provide for multiple conduits because of DSLs inherent inability to handle multiple large-scale, high-bandwidth applications for security, videoconferencing, facility management, and cable television.

Fully digital services, for example, DSL and ADSL (Asymmetric Digital Subscriber Line) wire-line communications, fiber optics, and related wireless technologies such as Wi-Fi and WIMAX, use digital transmission over the wires of a local telephone network, and are particularly disadvantageous in facilities management and security applications because facilities applications rely heavily on the use of analog equipment. Presently known architectures supporting both analog and digital equipment have required large-scale capital improvements with significant economic requirements carrying forward. Furthermore, such architectures have yet to realize a control system capable of full-scale interoperability between disparate devices providing services such as information technology computing, telecommunications, security surveillance, and cable television. Moreover, as alternative types of communications links with improved bandwidth capacities are developed or improved upon, operators must interconnect such links with existing telephone infrastructures from the Wide Area Network (WAN) and to facilities with legacy electronic equipment. However, such legacy equipment lacks the ability to be fully interoperable, under a single command authority, with other electronic computing systems. Due to ubiquitous large-scale embedded wire networks and numerous electrical systems needing access to such networks, there is a need for such systems to be brought under a central command authority for data transmission purposes.

Accordingly, the art has not produced a scalable architecture on a single network of existing infrastructure (including telephone wire, disparate equipment or devices, and legacy electronic equipment) or a parallel-based architecture utilizing existing telephone wires in combination with optical data transmissions. In addition, previously and currently known technologies fail to scale in a parallel fashion as a basic tenant of a delivery platform. This means that these services are not able to extend nationally or globally as demands increase or that QoS cannot be maintained for a fully integrated services suite on a large scale. For example, in facilities management and security applications, there has not been full-scale deployment of services based on IPTV (Internet Protocol Television), Wi-Fi, and WIMAX for security applications operating simultaneously, on the same infrastructure, and under the same control authority.

Also, there is currently need to interconnect RF links, optical links, and adaptive communications links with existing copper wire infrastructures to bridge communications links on a scalable parallel basis in order to maintain QoS requirements, especially as users' demand and consumption have increased due to a lack of channel capacity. Additionally there is a need to ensure that management of such an interconnected network is independent of disparate devices by being fully interoperable, for example, across devices provided by multiple vendors and devices that are not IP (Internet Protocol) addressable. The need to ensure interoperability has not previously been achievable in wire line or wireless communication systems. For example, facility-level services and "back haul" networks have experienced economic challenges due to QoS failures and unsuitable scalability of "last mile" delivery inside of buildings or facilities. Such failures and challenges are attributable, in part, to using a single communication pathway for computing, IT, security, and content delivery among multiple hardware devices, which may lack a central command structure due to being developed by different manufacturers or using different proprietary protocols.

There has not heretofore been employed a single command authority for managing network demands for large-scale implementations of disparate systems and services, including both legacy analog equipment and digital IP-addressable equipment. Also, there has also not been employed a cost effective and efficient method and apparatus for bridging these activities in an architecture which is operable with or without the utilizing the Internet, and in either analog or digital form, while maintaining the ability to scale. Also, there has not been employed a cost effective and efficient method and apparatus for dynamically allocating frequency to meet the above and other needs. Namely, the needs to standardize the patterns and distribution of video across land line and wireless networks simultaneously, and to scale them across large-scale geographic ranges, i.e., a city wide or national basis, without regard to geographic or terrestrial considerations and being integratable to both analog and digital environments. Moreover, there has not been employed a such a network that provides for high bandwidth transmissions over twisted pair links that presently form the backbone of the local telephone infrastructure in the United States and other countries.

BRIEF SUMMARY OF THE INVENTION

One embodiment of the present invention is a hybrid communications machine defining a computer having a non-transitory computer memory and a computer processor. The hybrid communications machine enables interoperable and low-latency networking among service devices. The hybrid communications machine includes an analytic I/O device for receiving a plurality of incoming data transmissions, the incoming data transmissions including a plurality of analog data transmissions via one of an impedance-matched twisted-pair copper wire or optical media. The plurality of analog data transmissions media defines "VUTP media." Also received is a plurality of digital data transmissions via one of a fiber medium, twisted pair copper wire, or wireless medium, the plurality of digital data transmissions. The plurality of digital data transmissions defines "Ethernet transmission media." Each of the analog data transmissions are received from a plurality of analog service devices implementing a unique device protocol and each digital data transmissions are received from a plurality of digital service devices implementing a unique device protocol.

Also included in the hybrid communications machine is a computer program product stored in the non-transitory computer memory and operable on the computer. The computer program product performs a process of controlling the digital service devices and analog service devices and a process of allocating a frequency spectrum for data transmissions.

The computer program product includes automated- and when necessary, biometric synthetic instructions to match, upon receiving the incoming data transmission, the data transmission to a plurality of analog device protocols to determine the necessary instructions and transmission media to command and control the plurality of analog service devices according to the data transmission or a plurality of digital device protocols to determine the necessary instructions and transmission media to command and control the plurality of digital service devices according to the data transmission. The computer program product also includes instructions to determine an outgoing transmission media for the incoming data transmission. The computer program product also includes instructions to construct outgoing data transmissions between any of the analog service devices and any of the digital service devices responsive to the matching of the analog and digital device protocols and the identification of the outgoing transmission media. The computer program product also includes instructions to dynamically allocate frequency spectrum for data transmissions between any of the analog service devices and any of the digital service devices, the dynamic allocation being responsive to any of a service type, service demand, and quality of service threshold for the outgoing transmission media and digital and analog device protocols.

A further embodiment of the present invention includes a computer program product stored in a non-transitory computer memory and operable on a computer. The computer program product performs a process of controlling the digital and analog devices and a process of allocating a frequency spectrum for data transmissions. The computer program product includes instructions to match, upon receiving the incoming data transmission, the data transmission to a plurality of analog device protocols to determine the necessary instructions and transmission media to command and control the plurality of analog service devices according to the data transmission or a plurality of digital device protocols to determine the necessary instructions and transmission media to command and control the plurality of digital service devices according to the data transmission. The computer program product also includes instructions to determine an outgoing transmission media for the incoming data transmission. The computer program product also includes instructions to construct outgoing data transmissions between any of the analog service devices and any of the digital service devices responsive to the matching of the analog and digital device protocols and the identification of the outgoing transmission media. The computer program product also includes instructions to dynamically allocate frequency spectrum for data transmissions between any of the analog service devices and any of the digital service devices, the dynamic allocation being responsive to any of a service type, service demand, and quality of service threshold for the outgoing transmission media and digital and analog device protocols.

A further embodiment of the present invention is a computer-implemented method implemented on a computer having non-transitory computer memory. The computer-implemented method performs a process of controlling digital and analog devices and a process of allocating a frequency spectrum for data transmissions. The computer-implemented method can match, upon the receipt of an incoming data transmission from a plurality of analog service devices and a plurality of digital service devices, the data transmission to a plurality of analog device protocols to determine the necessary instructions and transmission media to command and control the plurality of analog service devices according to a format of the data transmission or a plurality of digital device protocols to determine the necessary instructions and transmission media to command and control the plurality of digital service devices according to the data transmission. The computer-implemented method can determine an outgoing transmission media for the incoming data transmission. The computer-implemented method can construct outgoing data transmissions between any of the analog service devices and any of the digital service devices responsive to the matching of the analog and digital device protocols and the identification of the outgoing transmission media. Also, the computer-implemented method can dynamically allocate frequency spectrum for outgoing data transmissions between any of the analog service devices and any of the digital service devices, the dynamic allocation being responsive to any of a service type, service demand, and quality of service threshold for the outgoing transmission media and digital and analog device protocols.

BRIEF DESCRIPTION OF THE DRAWINGS

So that the manner in which the features and benefits of the invention, as well as others, which will become apparent, may be understood in more detail, a more particular description of the invention briefly summarized above may be by reference to the embodiments thereof, which are illustrated in the appended drawings, which form a part of this specification. It is also to be noted, however, that the drawings illustrate only various embodiments of the invention and are therefore not to be considered limiting of the invention's scope as it may include other effective embodiments as well, including those that can be operated by a neural computing architecture by example as part of a data input process.

DETAILED DESCRIPTION

Figure 1:
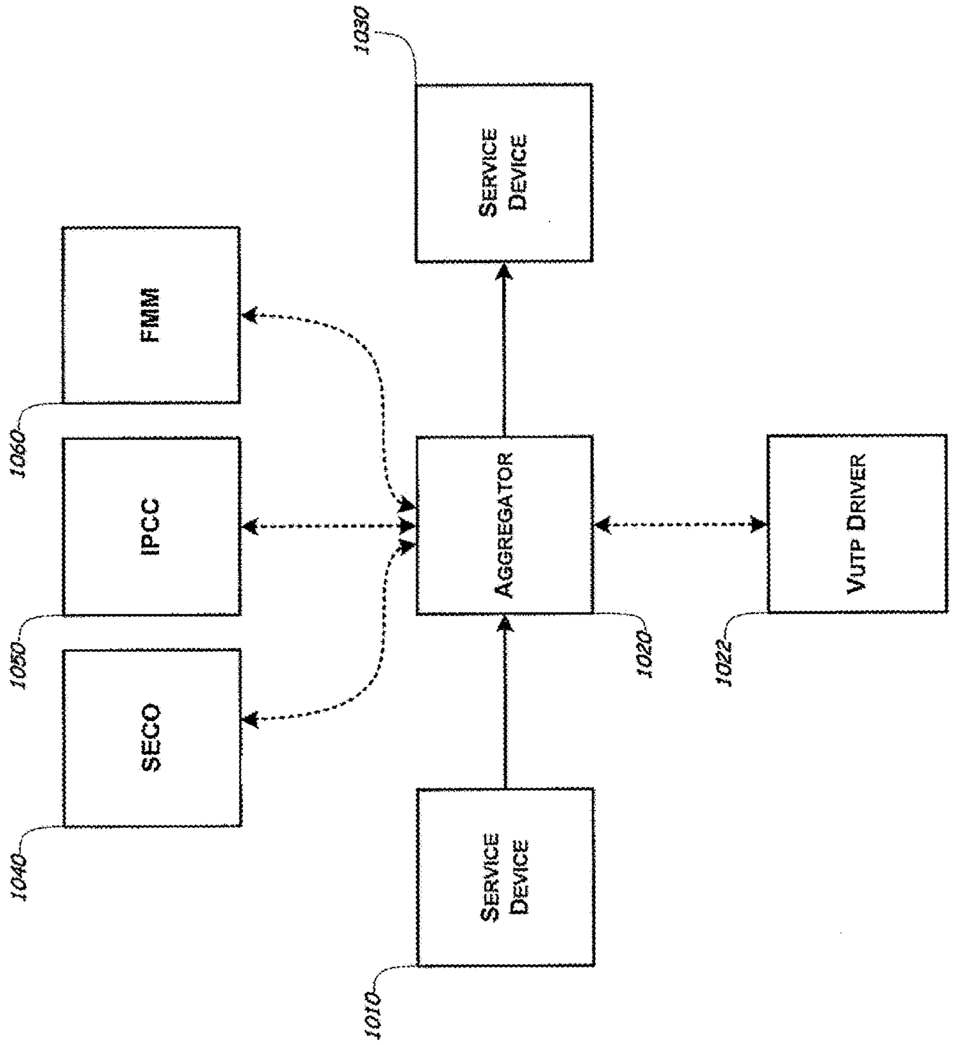
FIG. 1 is a block diagram illustrating an exemplary architecture for service devices in communication with an aggregator, the aggregator interacting with control modules, a frequency management module, and VUTP circuitry according to an embodiment of the invention.

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

It is an object of the present invention to provide a method and apparatus on an automated basis for ensuring sufficient transmission bandwidth over twisted pair links, where such twisted pair links span distances typically found in building and/or last mile applications. A further object of the present invention is to provide satisfactory transmission bandwidth for video, audio, and data applications over communication links, including links that use unshielded twisted pairs. An even further object of the invention is to employ a converter means that interconnects twisted pair links with digital data processing devices. Preferably, such converter also interconnects such devices with a plurality of alternative carriers such as optical, T1, and wireless links.

Another object of the invention is to enable high transmission bandwidths over a significant distance of twisted pair links by employing corrective circuitry. As such, corrective circuitry is operably coupled to the twisted pair links. Upon receipt of an analog signal, the circuitry is configured to ameliorate degradation in the received signal by imposing a correcting impedance associated with the twisted pair link. A further object of the present invention is to provide improvements that provide satisfactory transmission bandwidth by dynamically assigning frequency bands for transmission over twisted pair links operably coupled with correcting circuitry.

Another object of the present invention is to provide a communications network for the distribution of high-bandwidth services in a hybrid digital/analog environment (i.e., not one or the other) that allows for an automated central control authority over both IP-based hardware and legacy mechanical and electronic equipment and to improve upon DSL, Wi-Fi, WIMAX, and other wired or wireless communication platforms that require the use of serial equipment within the national communications infrastructure.

It is a further object of the present invention is to provide a means to convert an optical signal (i.e., wireless) to an analog signal in a manner that generates real-time information within the copper wiring used in today's telecommunications industry and extend the central control authority across systems and services for facilities management including, but not limited to, IT management, data storage, cable TV, video-on-demand, interactive ad management, data mining, emergency response, HVAC (heating, ventilating, and air conditioning), lighting, mechanical engineering control, fire detection and suppression, security monitoring and access control, nuclear process control authority, threat suppression, and ubiquitous cloud computing.

It is an object of the present invention to provide a system that provides a means to use twisted pair links for high data bandwidth applications to enable systems and services for facilities management including, but not limited to, IT management, data storage, cable TV, video-on-demand, emergency response, HVAC (heating, ventilating, and air conditioning), lighting, mechanical engineering control, fire detection and suppression, and security monitoring and access control to be fully interoperable with each other, transmittable across phone lines, and displayable in a video-based interface.

It is a further object of the present invention to enable the central control authority to integrate command and control over multiple electronic systems and services for facilities management including, but not limited to, IT management, data storage, cable TV, video-on-demand, emergency response, HVAC (heating, ventilating, and air conditioning), lighting, mechanical engineering control, fire detection and suppression, and security monitoring and access control so that they are completely interoperable, i.e., able to communicate with each other. Another object of the present invention provide a network model having long-term efficiency, i.e., lower initial costs, going forward, for deploying new electronic systems and services for facilities management, and therefore lacks the disproportionately and exponentially increasing investment costs that have heretofore contributed to a general trend of consolidation in the networking and telecommunications fields. It is a further object of the present invention to enable a "turnkey" integration package allowing the upgrade of any system or component of such a network without incurring costs to replace an entire system or taking system-wide measures to ensure compatibility or interoperability.

It is a further object of the present invention that the central control authority allow such systems and services to operate on minimal infrastructure while supporting full redundancy and be sufficiently robust to support disparate systems, such as systems supported by different vendors, systems using different communication protocols, out of date or legacy systems, and systems that may be otherwise unrelated in form or function. It is also an object of the present invention to integrate disparate systems, analog and digital alike, under one single command authority and interconnected to bridge communication links on a scalable parallel basis in order to maintain QoS, including using RF links, optical links, and adaptive communication links with existing copper wire infrastructures.

It is an object of the present invention to provide a central control authority to enable large-scale authorizations of channels allocated for the purpose of providing control over disparate systems and services, which may be produced by multiple different manufacturers, operable according to commands from multiple software programs and APIs, with or without an IP (Internet Protocol) address, and bundling them for local area and wide area distribution. Another object of the present invention is to standardize the patterns and distribution of high-bandwidth services, such as video, across landline and wireless networks and to scale them across large-scale geographic and terrestrial delivery stations, either on a citywide or national basis, without regard to geographic or terrestrial constraints. Another object of the present invention is to provide a parallel and distributed architecture in circuitry and software control to ensure consistency and interoperability across an entire citywide or nationwide network, which can include large-scale deployments of electronic systems without requiring cost-intensive deployment of additional towers or central switching stations, and operate in a clustered and non-clustered environment, and can maintain DES encryption and other classified communication standards, and operate in real time with redundancy and fail-safe characteristics.

VUTP Circuitry

To achieve some of the foregoing objectives, the invention will be described with reference to the central premise equipment with corrective circuitry (called "VUTP" or "VUTP Circuitry" herein, VUTP an acronym for "video over unshielded twisted pair") as described more fully in United States Patent Publication No. US 2007/0245393A1.

Networks enhanced with VUTP circuitry may be called VUTP networks herein, the transport media being called "VUTP wire" herein, Networks enhanced with VUTP circuitry and having a central control authority having control modules, drivers, converters, amplifiers, and software enabling communication with digital and analog service devices may be called VUTP Hybrid Networks or a VUTP Hybrid System. Also to achieve some of the foregoing objectives, there is provided an improvement upon VUTP-class technologies to advance the field of wire-line and wireless communication systems integration by using a combination of VUTP circuitry and optical and/or adaptive transmission links ("adaptive/optical" links), thereby transforming an optical signal to an analog signal then implementing a corrective impedance circuitry to the copper wire over which the signal travels, allowing for improved throughput that enhances the facility control systems being utilized to send and receive higher value video voice and data transmissions from any or all of the associated electronic equipment which resides in the home or building and/or extend the range of control over the overall system.

The corrective circuitry can be employed in embodiments of the present invention, particularly the aggregator, to enable communications between the aggregator and various service devices on a VUTP network. As used herein, the term "service device" means any device, equipment, system, machine, computer, or other electronic apparatus in communication with any of the embodiments disclosed herein, such as the CPE 100 or the aggregator 1020. Service devices, include, but are not limited to, electronic systems or services for facilities management including, but not limited to, IT management, data management and storage, cable TV, video-on-demand, emergency response, HVAC (heating, ventilating, and air conditioning), lighting, mechanical engineering control, fire detection and suppression, and security monitoring and access control. The maintenance of bandwidths between service devices allows broadband signals to be transmitted over significant lengths while meeting aforementioned bandwidth and other demands.

Figure 2:
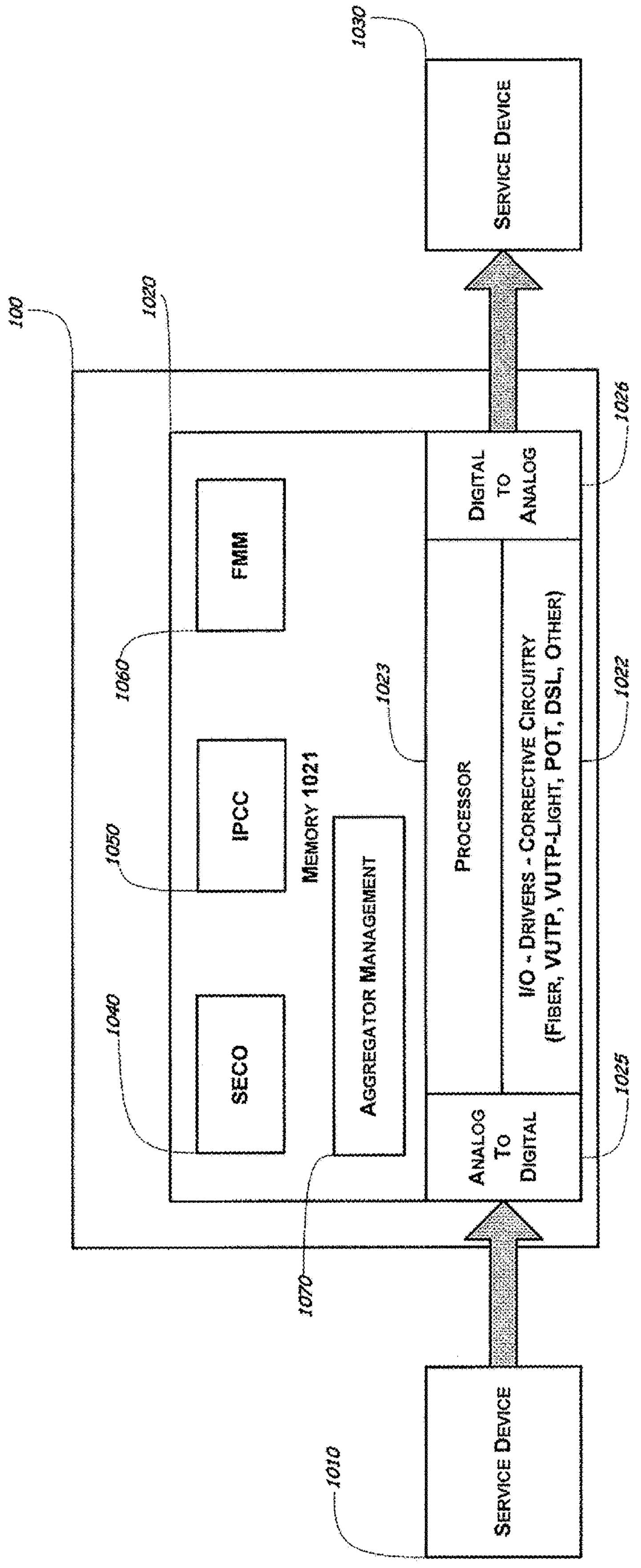
FIG. 2 is a block diagram illustrating a first exemplary architecture of an aggregator according to an embodiment of the invention.

For example, the aggregator preferably includes an optical transmitter and receiver, and incorporates an FVUTP (e.g., FDDI to VUTP converter) for optical-to-analog conversion utilizing an optical transmitter and an optical light-diode receiver, utilizing a scalable electronic control operating system having parallel computing architectures on Dynamic Spectrum Allocation channels to bridge IT data systems and security and facilities management capabilities into one "Hybrid" authority. The structure and operation of the FVUTP is described in further detail with reference to FIG. 8 and FIG. 9, and can be implemented in the aggregator preferably in the I/O driver block 1022 as shown in FIG. 2. The system advantageously allows for longer range capabilities and/or improved throughput, and by using parallel computing architectures, enables that authority to bridge national and international physical boundaries and scale on a massive parallel basis. Once the optical signal is received an optical to analog conversion may be performed, which allow for real time information (data) to be distributed within the traditional copper wiring system at greater range and/or throughput.

Figure 8:
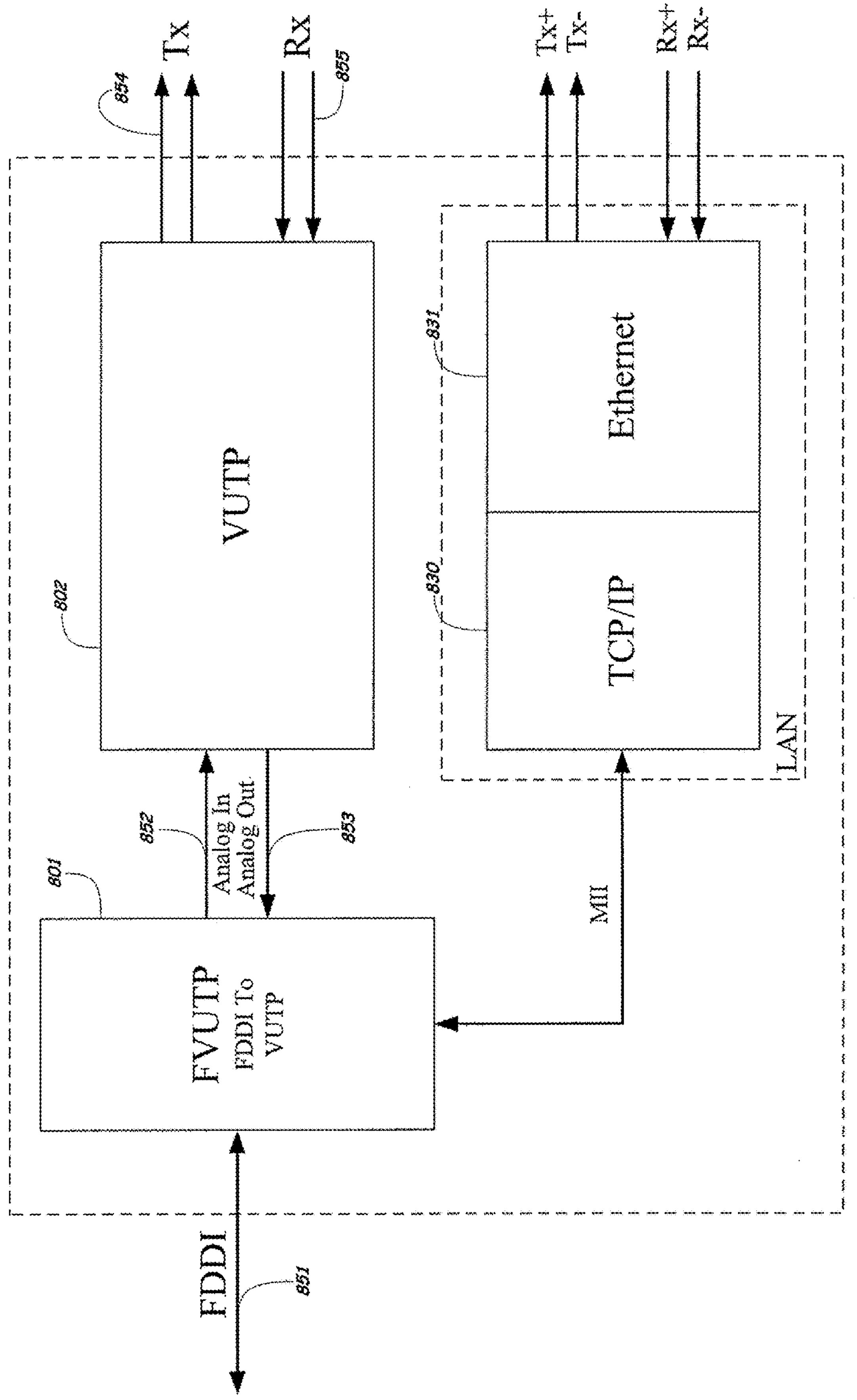
FIG. 8 is a block diagram illustrating an exemplary fiber interface connecting to a unique FVUTP converter and having the ability for the system to communicate with traditional Local Area Networks according to an embodiment of the invention.
Figure 9:
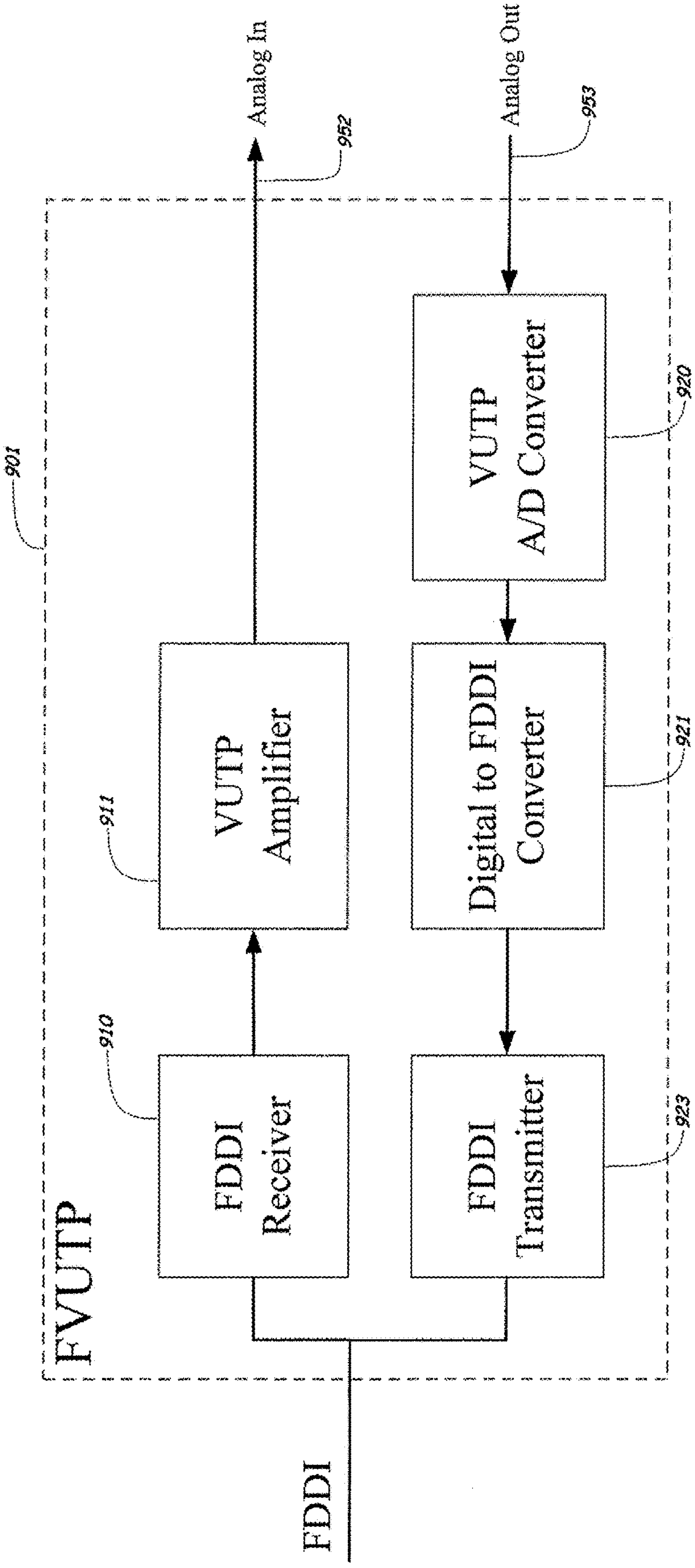
FIG. 9 is a block diagram illustrating an exemplary construction of an FVUTP converter according to an embodiment of the invention.

Embodiments of the present invention provide for the distribution of real-time information (data) within a traditional wiring system at greater range and/or throughput, in analog form, after conversion of a received optical signal, which is accomplished with an FDDI-to-VUTP converter 801 as will be described with reference to FIG. 8. In FIG. 8, a fiber (FDDI) interface 851 connecting to a unique FVUTP (also referred to as the FDDI-to-VUTP converter) 801 is shown. The FVUTP 801 receives an optical signal 851 and converts it to a single-ended analog signal 852, which is then processed by the VUTP block 802. The FVUTP 801 is preferably enabled with the amplifiers illustrated in FIG. 9, which generate the input signal to the VUTP circuitry 802. The FVUTP 901 may also include an FDDI receiver 910 and a VUTP amplifier 911 along the circuit path input to the VUTP circuitry 802, and a VUTP analog-to-digital converter 920, digital-to-FDDI converter, and an FDDI Transmitter 923 along the circuit path output from the VUTP circuitry 802. When an FDDI signal 951 is received at the receiver 910, the VUTP amplifier 911 amplifies the signal within the constraints of the VUTP block 802 connected via the analog-in line 952. The amplitude and bandwidth associated with the VUTP amplifier correlate to the VUTP block 802 to allow for a properly matched system. The FDDI transmitter 923 may be driven by a digitized signal from the VUTP converter 920 receiving signaling by the analog-out line 953. The VUTP analog-to-digital converter 920 takes signals from the VUTP block 802 and digitizes the signal in order to have the digital-to-FDDI converter 921 process the signal for the FDDI transmitter 823.

The VUTP circuitry 802 enables the conversion to the corresponding VUTP technology. The amplifier in the VUTP circuitry is set with a sufficient bandwidth to accommodate the VUTP technology system. The amplifier or other signal correction means of the VUTP circuitry are thus operable to correct the signal for further transmission over twisted pair lines. The VUTP circuitry receives and transmits signals Rx 855 and Tx 854. An RX signal 853 is generated as analog out from the VUTP circuitry 802 to the FVUTP 801. The analog out interface on the FVUTP has an internal analog to digital converter, which receives the analog VUTP signal, and processes the signal. The converted digital signal is then ready to be sent over the FDDI interface.

Embodiments of the invention can include the additional functionality to communicate with traditional local area networks ("LAN") as shown in FIG. 8, using existing 10/100 base Ethernet technology and "dry pair" non-Ethernet, both of which are based and run on existing twisted-pair telephone wire of various categories without limitation. Embodiments allowing LAN communications have a TCP/IP controller 830 and Ethernet controller 831 as shown.

The present invention provides an improved telecommunication system, an improved network and communication system for control and management of facility equipment, improved components of such a system, and improved transmission bandwidth for video, audio, and data content exchange. In contrast to known systems, the present invention expands the usefulness of existing and more economically desirable communication links, such as twisted pair links. Moreover, the present invention provides systems and methods that expand the usefulness of such links. For example, the present invention provides improvements over conventional telecommunications networks using DSL and other wired or wireless communications platforms that require the use of the national infrastructure of copper for utilizing serial equipment. The present invention improves upon these known architectures, which would otherwise require large-scale capital investment and improvements to allow a control system capable of large-scale interoperability between systems for facilities management including, but not limited to, IT management, data storage, cable TV, video-on-demand, emergency response, HVAC (heating, ventilating, and air conditioning), lighting, mechanical engineering control, fire detection and suppression, and security monitoring and access control. Embodiments of the present invention provide a scalable architecture on a single network of existing infrastructure of telephone wire and electronic equipment from different manufacturers independently, in parallel, utilizing the existing network of telephone wires in combination with optical transmission of data. While the preferred embodiment is explained in the context of twisted pair links, one of ordinary skill would appreciate that the invention may utilize alternative links such as shielded twisted pair, screened shielded twisted pair, and screened unshielded twisted pair (and any other variant of a twisted pair). The improved telecommunication system is discussed in detail below including dynamic allocation of spectrum, command and control systems, and specific embodiments of such improvements.

VUTP Telecommunications Network

Figure 4:
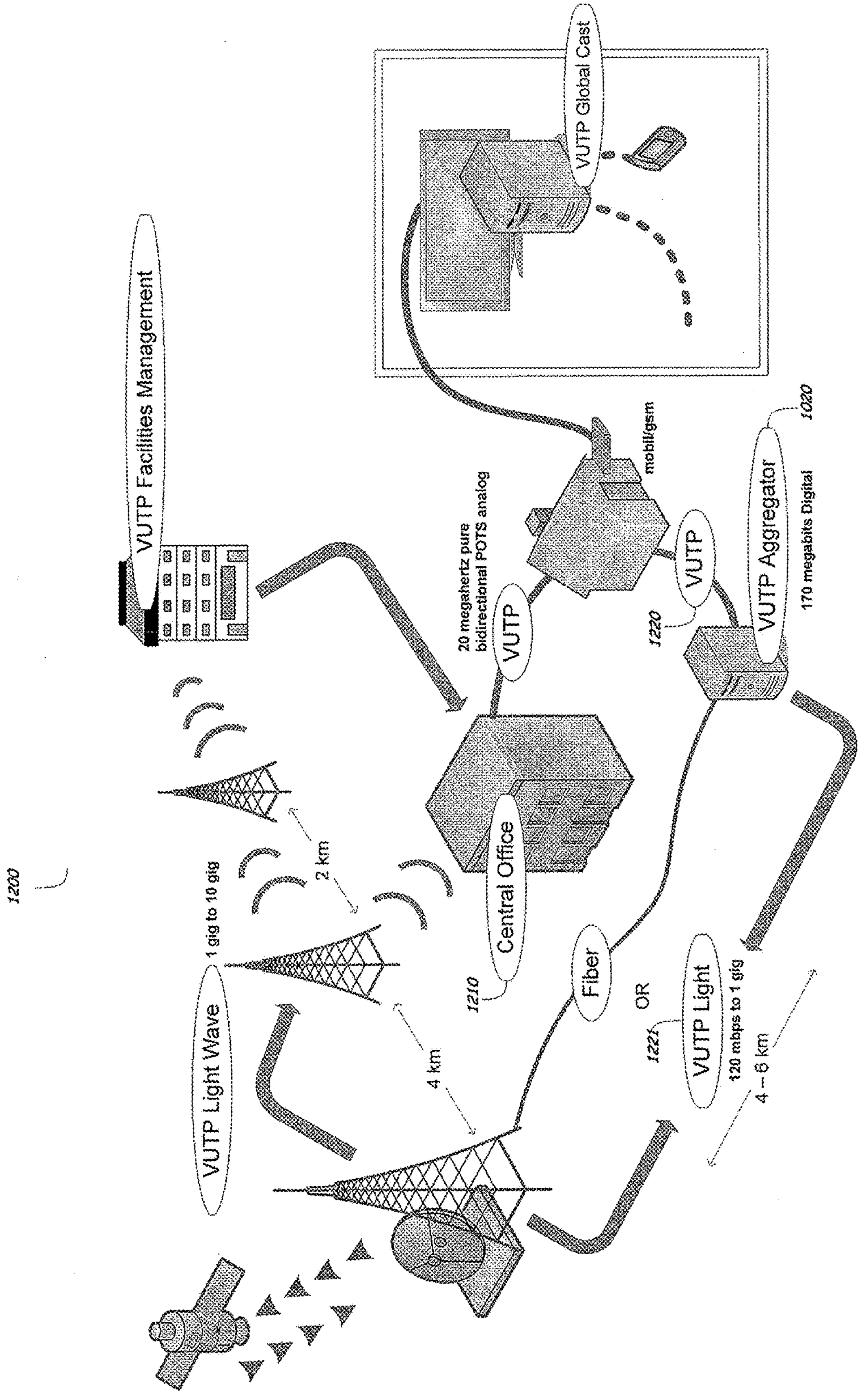
FIG. 4 is a schematic illustrating an exemplary embodiment of a VUTP communications network according to an embodiment of the invention.

A preferred embodiment of a VUTP network consistent with the present invention is shown in FIG. 4, which illustrates a system providing a hybrid communications network 1200, and using a combination of VUTP circuitry 1220 and optical and/or adaptive transmission links 1221 as disclosed below working with an aggregator having certain control modules for a number of electronic equipment devices connected to the network (which may also be called service devices or electronic equipment herein).

VUTP circuitry and the hybrid network have applications to both residential and commercial buildings and residential communities, which already have extensive existing twisted pair wiring. In such a use, the existing twisted pair wiring is reused with the adaptive and/or optical communication links. For example, preferred embodiments can accomplish such by sending transmissions via a mesh adaptive network from a point of presence ("POP") to key locations throughout a neighborhood or a city, for example, at a distance of 1-40 kilometers. Using VUTP with a straight optical-to-adaptive or any combination of the following methods in a mesh configuration will increase the bandwidth available to the consumer and provide a flexible delivery mechanism for the content provider at a significant reduction of cost. Also, such an embodiment will give the consumer the access to all multiple services (e.g., facilities management, data computing, and security) on the same infrastructure on a fail-resistant parallel computing basis for exchanging commands to the network.

Figure 5:
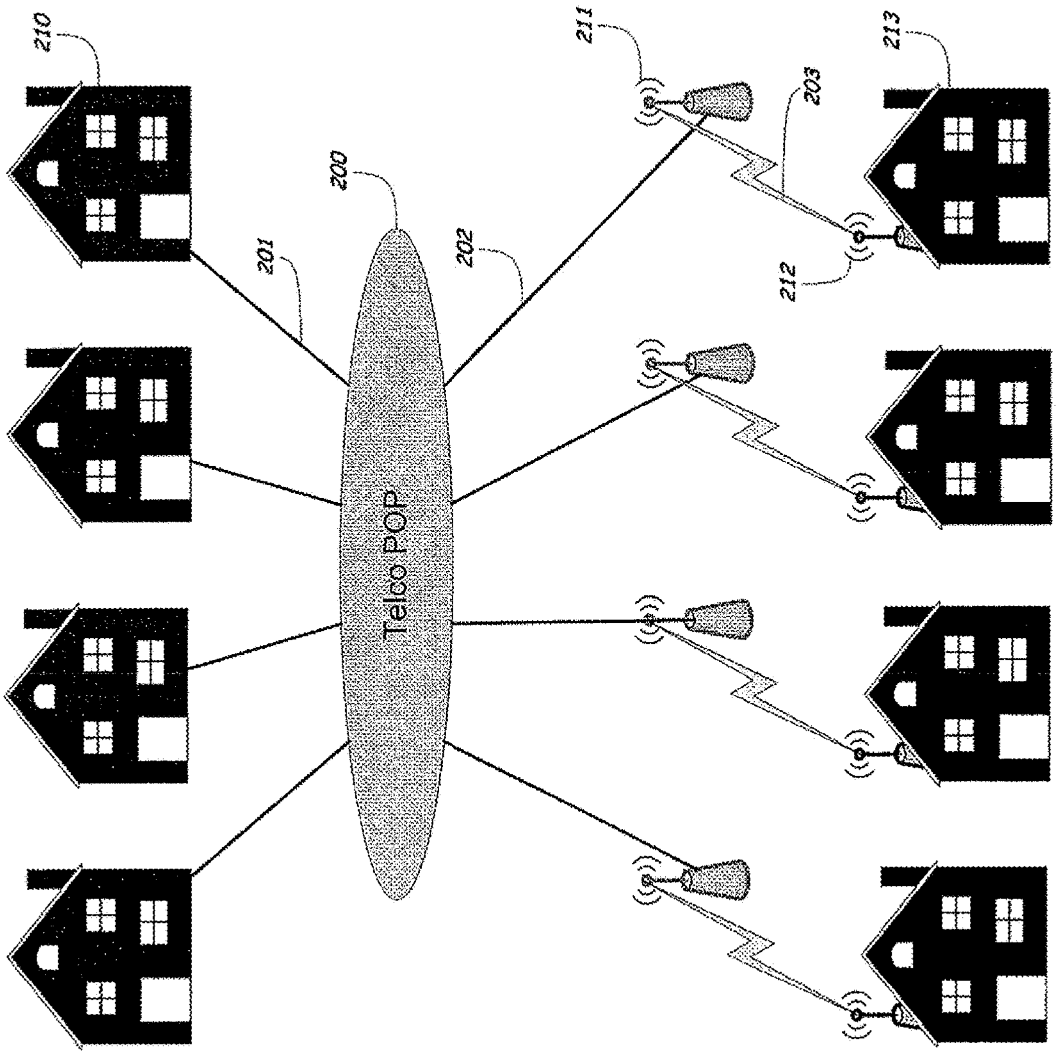
FIG. 5 is a network diagram illustrating exemplary data transmissions among structures using twisted pair links to one set of homes, and adaptive/optical signal transmission/reception links to another set of homes according to an embodiment of the invention.

An embodiment for a network topology using VUTP corrective circuitry is illustrated for a residential environment FIG. 5, although those skilled in the art will appreciate that the matter set forth in FIG. 5 is not limited to residences in a residential community, but can also be applied to commercial buildings or facilities, or any set of structures, facilities, or buildings regardless of physical association. VUTP corrective circuitry and twisted pair copper wire 201 exist within the home or homes 210 and connecting the home 210 a Telco POP 200. VUTP corrective circuitry and twisted pair copper wire 202 also connects the Telco POP 200 to a plurality of adaptive/optical signal transmitters and/or receivers 211, which communicates via adaptive/optical signal 203 to an adaptive/optical transmitter and/or receiver 212 in the home 213, where adaptive/optical devices 211 and 212 are capable of being positioned in the line of sight to provide for adaptive/optical communication.

Figure 6:
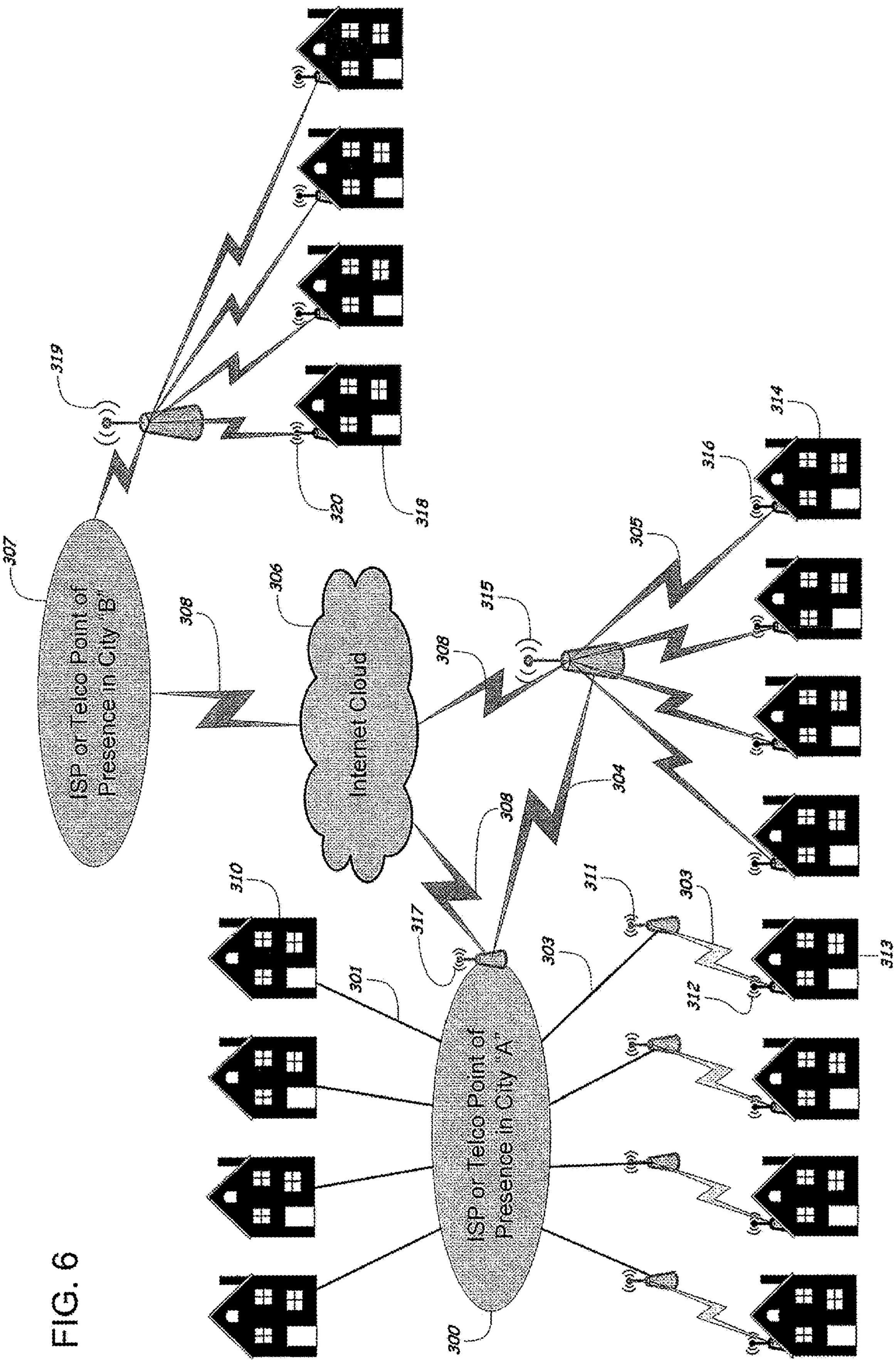
FIG. 6 is a network diagram illustrating exemplary data transmissions among structures as in FIG. 5 using the Internet and two ISPs or Telco points of presence in two cities A and B according to an embodiment of the invention.

An alternative embodiment for a network topology using VUTP corrective circuitry is illustrated for a residential environment FIG. 6, although those skilled in the art will appreciate that the matter set forth in FIG. 6 is not limited to residences in a residential community, but can also be applied to commercial buildings or facilities, or any set of structures, facilities, or buildings regardless of physical association. Homes that are not in the line of sight to a roof or pole-mounted adaptive/optical device may integrated into the VUTP network topology through a wireless implementation, such as Wi-Fi or WIMAX, for example, using power or light poles to mount the wireless devices 315 throughout the area. The wireless device 315 will connect with the Telco POP 300 using adaptive/optical signal 304 as a backhaul which is managed by a parallel-based command authority managing an adaptive optical transmitter 317. The wireless device 315 connects the backhaul 304 with the structures, e.g., residences or commercial buildings, using Wi-Fi or WIMAX signals 305, connecting to a Wi-Fi or WIMAX access point in the home 316 to bring the VUTP technology into the structure. VUTP corrective circuitry and/or twisted pair copper wire are preferably installed within each of the structures 313 and 314, as is typical in most communities in the United States. Structures 310 are connected to the Telco POP over VUTP links 301, i.e. twisted pair wires with VUTP corrective circuitry. Structures 313 are equipped with adaptive/optical transmission or reception means 312, which connects over adaptive/optical signals 303 to adaptive/optical transmission or reception means 311, which are connected to the Telco POP over VUTP links 302. Within the structures, the adaptive/optical transmission or reception means 312 can connect to equipment (not pictured) using, for example, existed twisted pair wires within the structure.

An alternative embodiment for a network topology using VUTP corrective circuitry can be scaled to create larger networks, for example, connecting cities and towns using the Internet as a connection method between cities or towns, as illustrated in FIG. 6. The Internet 306 can be used as a backhaul in conjunction with laser backhaul links and/or fiber links 308 between Telco POPs 300 and 307. The optical technology is a "layer one" protocol. Layer one receives frames or data from higher layers and communicates such frames or data between points in a communication, such as communications between devices, Hubs and/or Repeaters. When a protocol at the physical layer receives information from the upper Layers through IT based software from any number of vendors; it translates all the data into signals that can be transmitted on a transmission medium. This is called Signal Encoding. That is, the ones and zeros of data are converted into electrical on-offs by the physical layer protocols. VUTP circuitry may be used for integrating video working with the existing Infrastructure of Internet Protocol Television (IPTV). For instance, when using video compression techniques and sending digital video for IPTV, via an UP over ADSL for example, a network can be enhanced with an optical light fiber transmission link and then converted over the existing twisted pair inside the home. The hybrid network combinations described herein also provide transmission links for High Definition Content.

Examples of adaptive transmission schemes incorporated by the present invention include, for example, those described in U.S. Pat. No. 7,155,134 ("Pulse amplitude modulated transmission scheme for optical channels with soft decision decoding") and U.S. Pat. No. 6,412,989 ("Directable laser transmission module").

Aggregator

Known communication systems and security services may provide an adequate service for defending against the specific threat they are designed to address. The real vulnerabilities exist in the gaps between these services, which occur because there has been no system designed today which bridges those systems on a parallel basis utilizing the existing infrastructure of copper tied into an adaptive optical wide area delivery to scale on a citywide or national basis. The most glaring gap is between management of users' access to physical security devices (including, for example, but not limited to, the doors, alarm systems, perimeter-monitoring devices, etc) and the logical resources (including, for example, but not limited to, applications, databases, accounts, etc) they need to perform their job. For example, when the security posture at a facility is raised, currently there is no assurance that a restricted individual no longer has access to certain sensitive physical locations or, perhaps, more restricted access to sensitive data in the form of video voice or data. To offer full protection to its facilities and resources, an organization needs a centralized control and management system that can manage security and monitoring across disparate devices, applications, and resources as well as address this existing gap between the management of the physical and logical realms. The VUTP Hybrid Communications Network enables such centralized control and management.

Service devices or assets, for example 1010 and 1030, communicating or transmitting data over the VUTP Hybrid Communications Network may include both IT (Information Technology) assets, such as the computers, switches, and non-IT assets, such as the system equipment, for example the cameras, the locks, sensors, and card-readers that are associated with the system. Other examples of assets or devices in the system include, without limitation, IT management, data storage, cable TV, video-on-demand, emergency response, HVAC (heating, ventilating, and air conditioning), lighting, mechanical engineering control, fire detection and suppression, and security monitoring and access control. It is not necessary that such systems be manufactured or supported by the same vendors or use the same standards and protocols, or are otherwise related in function. Assets may be tracked with financial information, quantity on hand so that replacements components are assured to be available in the event of a failure of a physical security component. Asset or device operators and their training or certification may also be tracked. Traditional IT assets may be integrated with non-IT asset management, for example, an IP addressable card reader on a door may be controlled as a physical asset. Other examples of assets may include those used in facilities for aircraft maintenance or nuclear power plants, or linear assets, such as roads, cable systems, and borders.

Unlike known systems and methods for facilities management, assets are not required to be "smart" or "intelligent" or even IP-addressable, i.e., having internet protocols built into their logic. Preferred embodiments of the invention address the need for mass communication between and among analog devices and digital devices and means to bridge between "intelligent" networks and legacy mechanical controls and in wired and wireless forms.

Figure 3:
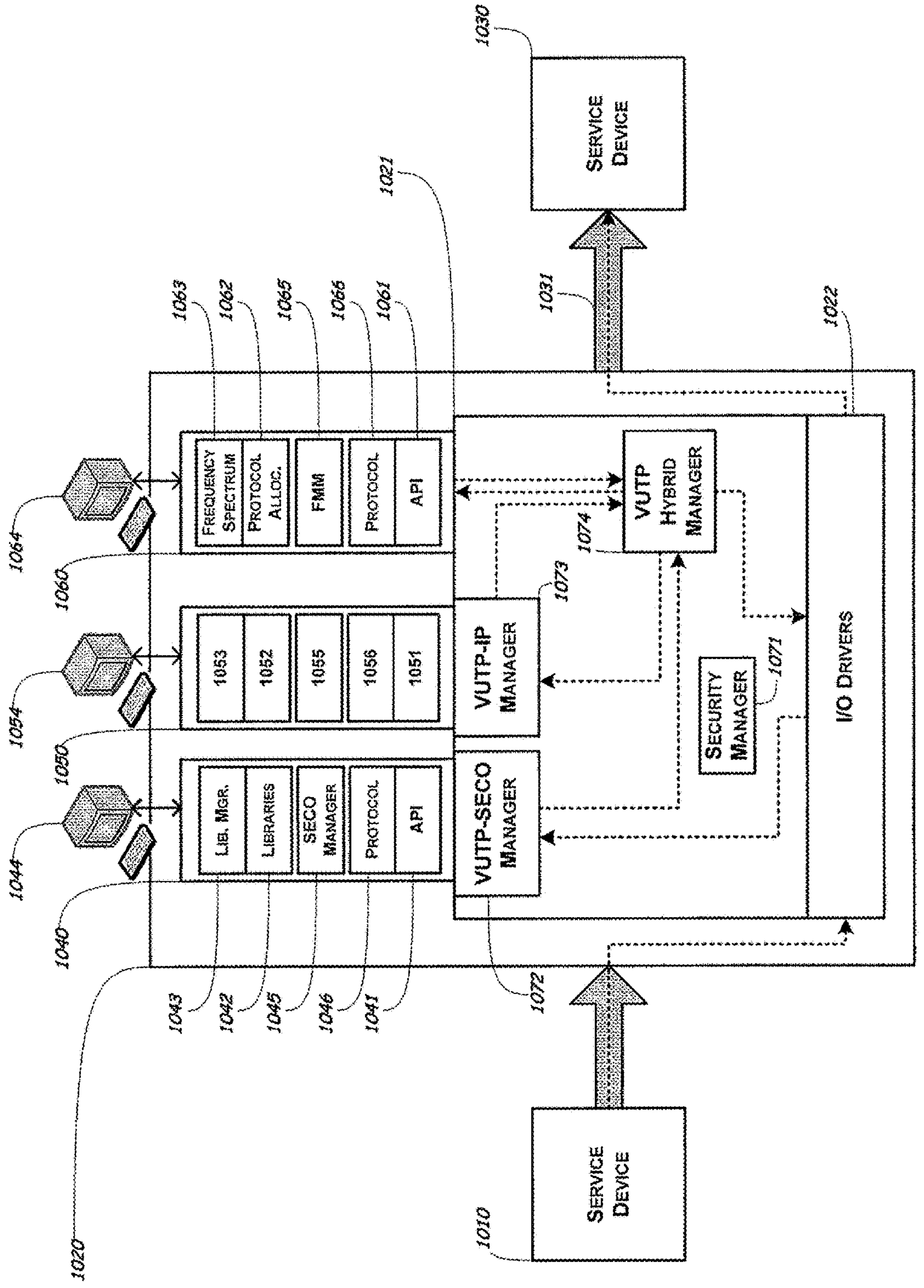
FIG. 3 is a schematic illustrating a second exemplary architecture of an aggregator according to an embodiment of the invention.

Embodiments of the present invention achieve some of the foregoing objectives, as will be described with reference to FIG. 1, FIG. 2, and FIG. 3, with like elements in the drawings having consistent numbering throughout FIG. 1, FIG. 2, and FIG. 3. A preferred embodiment, as illustrated in FIG. 3, incorporates control modules 1040 and 1050 and frequency management module 1060 into the aggregator 1020, but those skilled in the art will appreciate that the present invention is not limited to incorporating the control modules within the aggregator, but that the control modules, alternatively, may be external or remote from the aggregator and connecting to the aggregator using any wired or wireless medium available to those of skill in the art as shown in FIG. 1. The control modules enable the aggregator to manage and control multiple service devices such as service device 1010 and service device 1030, including without limitation systems for video, voice, and data transmissions, from multiple vendors. The control modules enable to aggregator to provide a central control authority over disparate types, classes, or manufactures of service devices on an agnostic basis and extend that authority through fully interoperable IT/data management software under a parallel computing architecture, providing communication pathways for system and sub system level command and control reporting.

Also to achieve some of the foregoing objectives, there is provided an architecture to enable a fully-scalable central control authority (also called a control center) using a parallel computing architecture on dynamically-allocated spectrum channels (e.g., allocated based on the need and the ability to scale) to bridge disparate service devices, e.g., IT Data Systems and Security and Facilities Management systems and services, into one "hybrid" authority that is capable of being utilized with or without the internet, in analog or digital form, while maintaining the ability to scale. The control center, for example, can manage delivery of natural and adaptive optical transmissions at a distribution authority in the area of facilities management. As shown in FIG. 1 and FIG. 2, the CPE 100 and/or the aggregator 1020 aggregator allows interoperability in the so-called "Hybrid" digital/analog environment and provides a point for central control authority over both IP-based hardware and legacy ICC systems. The present application and its claims are directed to the preferred embodiment in which the aggregator 1020 is implemented as a stand-alone device as illustrated in FIG. 3, but those skilled in the art will understand that the aggregator 1020 can be incorporated into a CPE as in FIG. 2, the CPE being more fully described in United States Patent Publication No. US 2007/0245393A1, which is incorporated by reference fully herein. Also, as shown in FIG. 1 and FIG. 3, the aggregator 1020 may have component modules 1040, 1050, 1060, and 1070 either remote from the aggregator or included therein, with the preferred embodiment being shown in FIG. 3, wherein the component modules 1040, 1050, 1060, and 1070 are included in the aggregator.

For example, embodiments of the present invention provide a central control authority that can integrate control and management of various service devices for as IT/data, cable television, video on demand, emergency response, HVAC, lighting, mechanical, engineering, fire, and security systems to make them completely interoperable ("communicate with each other") even if they are disparate service devices, i.e. they are provided by completely different vendors or otherwise not common or compatible with each other and allow them to simultaneously function and operate minimal infrastructure having full redundancy. Such embodiments shall enabling a "Turnkey" integration package for upgrading any service device or other system component at will and without concern of present or future costs to replace the entire system and without concern about future capabilities ability to be interoperable.

The VUTP Hybrid Aggregator system provides the means to manage various control modules for any service device on the VUTP Hybrid network. The aggregator baseline architecture is seen in FIG. 2, which consists of a memory 1021 having thereon management modules 1040 and 1050, VUTP Frequency Management Module 1060, an aggregator manager 1022, an operating system such as Linux, its associated transport drivers and the transport media themselves such as Fiber, VUTP, and others. The aggregator can be viewed as a wrapper interface for all of the service devices and control modules to enable the VUTP Hybrid System, i.e., enable communications and data transmissions among a multitude of service devices within the communication network.

As can be seen in FIG. 2, the drivers 1022 are connected to the processor 1023. Processor 1023 is the "brains" of the aggregator 1020, and as such executes program products 1040, 1050, 1060, and/or 1070 and works in conjunction with the divers 1022 to direct data to memory 212 and to send data from memory 212 to a service device 1030. Processor 1023 can be any commercially available processor, or plurality of processors, adapted for use for the aggregator 1020, e.g., Intel® Xeon® multicore processors, Intel® micro-architecture Nehalem, AMD Opteron™ multicore processors, etc. As one skilled in the art will appreciate, processor 1023 may also include components that allow the aggregator 1020 to be connected to a display [not shown] and keyboard that would allow a user to directly access the processor 1020 and memory 1021.

Memory 1021 stores instructions for execution on the processor 1023, and consists of both non-volatile memory, e.g., hard disks, flash memory, optical disks, and the like, and volatile memory, e.g., SRAM, DRAM, SDRAM, etc., as required to process embodiments of the instant invention. As one skilled in the art will appreciate, though memory 1021 is depicted on, e.g., the motherboard, of the aggregator 1020, memory 1021 may also be a separate component or device, e.g., FLASH memory, connected to the aggregator 1020. Memory 1021 may also store applications that various workstations can access and run on the aggregator 1020. Importantly, memory 1021 stores the program products or modules 1040, 1050, 1060, and/or 1070 of the present invention. As one skilled in the art will understand, the program products, along with one or more databases/tables/ fields/records for library functions including service provider identification, transfer data transmissions, etc., can be stored either in memory 1021 or in separate memory associated, for example, with a storage medium (not pictured), positioned in communication with the aggregator 1020. Alternatively, the library functions and program implementations herein can be written using compressed spare row format (CSR) format to allow the program products or software modules to operate in parallel more quickly.

As one skilled in the art will appreciate, the aggregator allows both current and legacy systems to operate with the VUTP technology. As shown in FIG. 3, a facility commander facility management module such as the "SECO" (Scalable Control Operating System) 1040 may be adapted to connect the disclosed system to external transceiver devices using an analog interface. Similarly, an IP Command and Control Module ("IPCC") 1050 may be adapted to connect the system to external transceiver devices using a digital interface. In this manner, several million types of devices, such as RF, adaptive/optical, adaptive, IT/Data systems, content management systems, electrical and mechanical, and security and facilities systems having various physical interfaces can be interconnected without redesigning or replacing the disclosed hardware. This level of interconnection thereby allows the number of interconnected systems to be scaled immensely, even by the tens of thousands, while mainlining delivery of real-time information and video through direct interaction with various software-based authorities, which have traditionally been only able to communicate with intelligent computers but not sub-system electronics typically found in homes and buildings around the world.

Returning to FIG. 3, the SECO module 1040 includes a SECO API 1041, SECO library 1042, a library manager 1043 and a graphical user interface 1044, and receives data from an analog device (directed through an A/D converter to the microprocessor via a method known in the art). The VUTP-SECO manager 1072, according to the SECO API 1041, determines a target format for the data according to the SECO library 1042, The VUTP-SECO manager 1072 converts the data received to the target format. The available target formats include, without limitations, fiber, VUTP, VUTP-Light. The VUTP-SECO manager 1072 can also assemble and disassemble the data to provide the proper payload protocol as specified by the SECO module 1040 and direct the data to the driver 1022 corresponding to the transport medium 1031 identified by the SECO module 1040 for the destination service device 1030.

The SECO module 1040 as shown in FIG. 3 consists of a SECO device library 1042, which contains the various device protocols in order to control the device (such as HVAC, lighting, doors, etc). The libraries are managed by the SECO library manager 1043, which provides a means to be able to enter, modify, delete and of the libraries, such as a graphical user interface 1044. The SECO configuration manager 1045 allows a user at a graphical user interface 1046 the ability to setup the various command and control features within the SECO Module 1040. These features include, but are not limited, to timers, on/off scheduling, and various alerts conditions. The SECO configuration manager 1045 also provides the enabling and management of the SECO protocol to the aggregator 1020. The SECO protocol 1046 is a custom interface managed by the SECO configuration manager 1045, consisting of a building blocks of specific equipment requirements implemented and embedded into the SECO library 1042. For example, the type of information the SECO protocol 1046 would provide to the aggregator 1020 includes, but is not limited to: library name, device type, manufacture type, interface media definition, and scheduling information.

Returning to FIG. 3, the IPCC module 1040 includes an IPCC API 1051, an IPCC library 1052, a library manager 1053 and a graphical user interface 1054, and receives data from an analog device (directed through an A/D converter to the microprocessor via a method known in the art). The VUTP-IPCC manager 1072, according to the IPCC API 1041, determines a target format for the data according to the IPCC Library 1052. The VUTP-IPCC manager 1073 converts the data received to the target format. The available target formats include, without limitations, fiber, VUTP, VUTP-Light. The VUTP-IPCC manager 1073 can also assemble and disassemble the data to provide the proper payload protocol as specified by the IPCC module 1050 and direct the data to the driver 1022 corresponding to the transport medium 1031 identified by the IPCC module 1050 for the destination service device 1030.

The IPCC module 1050 as shown in FIG. 3 consists of an IPCC device library 1052, which contain the various device protocols in order to control the device (such as HVAC, Lighting, Doors, etc). The libraries are managed by the IPCC Library Manager 1053, which provides a means to be able to enter, modify, delete and of the libraries, such a graphical user interface 1054. The IPCC configuration manager 1055 allows a user at a graphical user interface 1056 the ability to setup the various command and control features within the IPCC Module 1050. These features include, but are not limited, to timers, on/off scheduling, and various alerts conditions. The IPCC configuration manager 1055 also provides the enabling and management of the IPCC protocol to the aggregator layer 1020. The IPCC protocol 1056 is a custom interface managed by the IPCC configuration manager 1055, consisting of a building blocks of specific equipment requirements implemented and embedded into the IPCC library 1052. For example, the type of information the IPCC protocol 1056 would provide to the aggregator 1020 includes, but is not limited to: library name, device type, manufacture type, interface media definition, and scheduling information.

Figure 10:
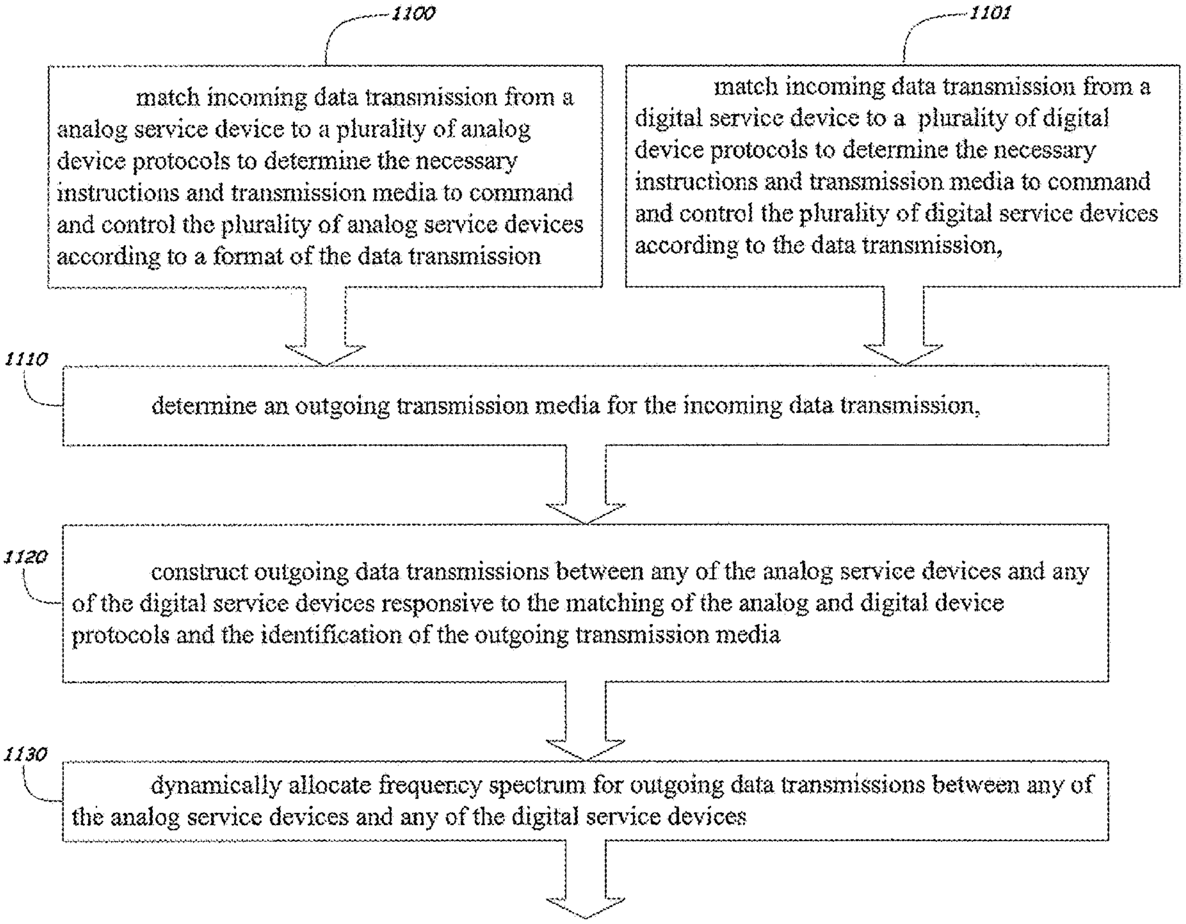
FIG. 10 is a flow chart illustrating exemplary software logic of the aggregator according to an embodiment of the invention.

As shown in FIG. 3, the VUTP Hybrid Manager 1074 is used as an administrative manager for the aggregator to manage and configure the aggregator. The VUTP Hybrid Manager provides the capabilities to set, assign and configure the interfaces between software modules for example SECO, IPCC, and the various transport medias such a fiber, VUTP, VUTP-light. The aggregator 1020 also includes a security manager 1071, which is used to manage security software algorithms within the SECO module and the IPCC module. The VUTP Hybrid Manager 1074 in coordination with the SECO module 1040 the IPCC module 1050 and the VUTP-SECO manager 1072 and the VUTP-IPCC manager 1073 perform the following steps as illustrated in FIG. 10. At step 1100, the VUTP Hybrid Manager matches incoming data transmission from an analog service device to a plurality of analog device protocols to determine the necessary instructions and transmission media to command and control the plurality of analog service devices according to a format of the data transmission. At Step 1101 the VUTP Hybrid Manager in coordination with the IPCC manager and the IPCC module match incoming data transmission from a digital service device to a plurality of digital device protocols to determine the necessary instructions and transmission media to command and control the plurality of digital service devices according to the data transmission. At Step 1110, the VUTP Hybrid Manager, in coordination with the SECO module or the IPCC module, determines an outgoing transmission media for the incoming data transmission. At step 1120, the VUTP Hybrid Manager, in coordination with the SECO module or the IPCC module, constructs outgoing data transmissions between any of the analog service devices and any of the digital service devices responsive to the matching of the analog and digital device protocols and the identification of the outgoing transmission media. And, at step 1130, the VUTP Hybrid Manager in coordination with the frequency management module 1060 dynamically allocates frequency spectrum for outgoing data transmissions between any of the analog service devices and any of the digital service devices.

Returning to FIG. 3, a frequency management module ("FMM") 1060 is preferably an operating system independent software application configured to receive a signal and dynamically manage and assign new frequency spectrum for video, audio, data and other services. Upon receiving such signals, FMM 1060 dynamically allocates a new frequency for the signal based upon frequency configuration settings known to or determined by FMM 1060. FMM 1060 also causes the signal to modulate over a communications link at a newly allocated frequency. The spectral range of the newly allocated frequency is selectively or automatically chosen by FMM 1060 based on the type of service(s), gauge, length and quality of the outgoing twisted pair link. Thus, the present invention provides a means to create and manage more usable channels, which equates to more available bandwidth. The frequency allocation manager provides the channel distribution for the information transmitted or received over the twisted-paired copper wire. In preferred embodiments, the frequency allocation manager is included in aggregator 1020 as illustrated in FIG. 3.

Figure 7:
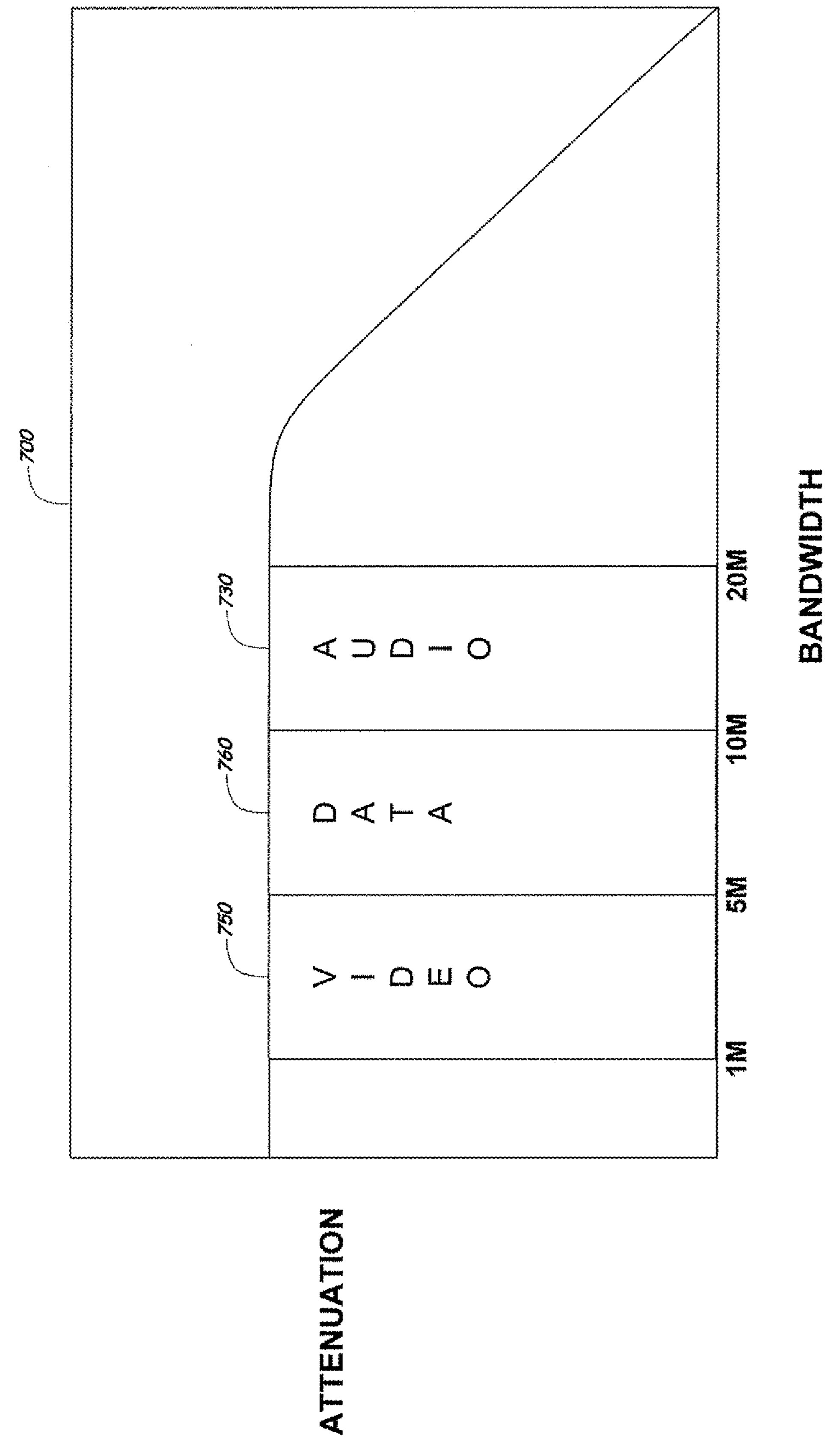
FIG. 7 is a graph illustrating an exemplary allocation of bandwidth for particular types of services according to an embodiment of the invention.

Embodiments of the invention dynamically allocate bandwidth depending on a particular type of services being delivered. FIG. 7 illustrates a preferred allocation scheme 700 for video services 750, data services 760, and audio services 730, and one of skill in the art will appreciate that any type of service including the combination of existing off-the-shelf software for IT or data management systems coupled with facility management systems provided by various vendors could be supported by communication networks featuring dynamic spectrum allocation as described herein. Embodiments of the invention may assign bandwidth based on one or more factors, such as the type of services available, customer service demands and quality of service requirements. FIG. 7 illustrates the aggregator's ability to dynamically allocate bandwidth for a particular type of service. Although only video, data, audio services are shown in the illustration, the information on the media can be any information associated with SECO command and control and managed at the VUTP aggregator station. One skilled in the art will appreciate that bandwidth frequency or sequencing can be used on twist-pair copper wire, optical technology, RF technologies, and other media.

In a further aspect of the invention, as shown in FIG. 3, FMM 1060 automatically assigns compensation factors to corrective circuitry. FMM 1060 computes compensation factors based upon known or computed impedance quantum associated with a twisted pair link. However, users and/or administrators can also input compensation factors via a graphical user interface 1064. Control signals may also update FMM 1060 with compensation factors.

Upon receiving a compensated signal, FMM 1060 dynamically allocates and reallocates frequency spectra for the received signals according to data transmission requirements and communication protocols including, for example, TCP/IP, NTSC, high-definition television ("HDTV"), sequential couleur a memoire ("SECAM"), phase alternating line ("PAL"), session initiation protocol (SIP"), 3d, etc. A protocol manager 1066 in FMM 1060 may store and selectively retrieve the rules associated with each of such transmission requirements and communication protocols when allocating new spectrum. The protocol manager may also provide for simultaneous support of each of such requirements and protocols when allocating new spectrum.

A system thus may employ the foregoing unique combination including the combination of dynamic frequency allocation and correcting circuitry for twisted pair links to take advantage of all available bandwidths for signal transmissions. More particularly, the system provides a combination of means for compensating signal degradation, and means for dynamically allocating frequencies and enabling high bandwidth signals for transmission over great spans of twisted pair links.

As noted above, an object of the present invention is to provide an improved system for regenerating degraded signals and dynamically allocating new frequency bands for specific categories of communication signals to enable high bandwidth transmissions over twisted pair links. As such, VUTP corrective circuitry, which preferably resides in the I/O and Drivers block 1022 and FMM 1060 are deployed in one embodiment of the present invention.

In general, corrective circuitry 1022 and FMM 1060 are operably coupled within a single device, referred to hereinafter as the aggregator 1020. The aggregator 1020 may also employs FMM 1020 in order to make use of available transmission bandwidth on twisted pair links by dynamically allocating frequency bands for use by specific categories of communication signals, preferably, ranging from 0 to 20 megahertz. In one embodiment, FMM 1060 dynamically allocates frequency bands of at least 4.5 megahertz.

As illustrated in FIG. 3, FMM 1060 consists of several logical blocks: Frequency Spectrum Assignment ("FSA") 1063, Protocol Allocation ("PA") 1062, and Graphical Configuration Interface ("CGI") 1064.

In general, FMM 1060 may be software preferably residing on the application layer of an operating system. FMM 1060 is preferably interoperable with a variety of operating systems, such as Linux and Windows CE. In addition, FMM 1060 may assign frequency according to configuration instructions provided to the aggregator 1020. Users and network administrators dynamically control aggregator 1060 and supply configuration information to manage spectrum usage in a way that optimizes available bandwidth over twisted pair links depending upon the range a signal will travel over twisted pair, the physical properties of twisted pair, and service demands of each user.

As illustrated in FIG. 3, Frequency Spectrum Assignment module (FSA) 1063 is a sub-module of FMM 1060. An object of this sub-module is to allocate discrete frequency bands, such as those in FIG. 7. Another object of the spectrum assignment block is to provide compensation factors to corrective circuitry. A further object of FSA 1063 is to control the range of frequencies allocated in the spectrum to various video 750, audio 730, and data 760 signals, among others. Accordingly, based upon spectrum assignment settings of 0 to 20 megahertz, as shown in FIG. 7, FSA 1063 assigns service categories into discrete frequency bands. Control signals are employed to initially configure frequency allocation assignments for service categories. Control signals define routing table information so that the signals reach the targeted recipient.

In addition, FSA 1063 preferably configures new frequency allocation assignments based on several factors including the physical properties of the twisted pair links. For example, signal transmissions requiring high QoS are allocated lower, more reliable, frequencies if the quality of the twisted pair link is low. Subscriber demands for a particular service optionally effect making frequency assignments. For example, highly viewed sporting events may necessitate wider frequency band allocation for video band 750. FSA 1063 may also analyze spectrum transmissions and determine if particular frequency is in greater demand. Finally, protocol specific requirements also play a factor in frequency assignments. For example, NTSC signal may require between 0 and 4.5 megahertz. FSA 1063 interoperates with PA 1062 to incorporate protocol specific requirements in frequency assignments.

The aggregator and FMM 1060 can dynamically allocate bandwidth based on the type of service. In a preferred embodiment, for example, one type of service transmission may require greater or lesser bandwidth than another service type. For example, video may require greater throughput than ordinary data or audio content. Also, video for security purposes may require being prioritized over cable television, Stereoscopic Holograms may require greater ranges of bandwidth allocation than traditional HDTV or NTSC, and access control video monitoring fire hazard and event notifications related to mechanical or electrical failure and threats may require more or less. Accordingly, the FSA 1063 is configured to dynamically allocate more or less bandwidth for video than for data and audio based on the needs established through the protocols written into the software at the applications layer which by means of this platform may have the ability to dynamically allocate commands to the system and subsystem level of existing hardware within the facility. In this manner, the system ensures that the throughput requirements for each service type are satisfied and the authority is extended to all class of IT systems, software architectures, communication systems, and all electrical systems on an agnostic basis.

Also, the FSA 1063 can dynamically allocate bandwidth based on customer demands for a given service. Customer demands for a given service may impose varying bandwidth requirements for different service type. For example, highly viewed video broadcasts may impose upon the system a need for greater video bandwidth in order to provide video content to all viewers. In emergency management systems, mass notification broadcasts may be needed to be prioritized over normal flow traffic across entire facilities or compounds. The system is configured to dynamically allocate greater bandwidth for video bandwidth during such broadcasts, and less bandwidth for audio and data, so that consumer video service demands are satisfied.

The FSA 1063 can also dynamically allocate bandwidth based on QoS needs. That is, defined QoS may be required for certain types of network traffic. For example, streaming multimedia may require guaranteed throughput to prevent playback from starving. Also, security systems may require a specific QoS to ensure alarm signals are timely propagated across the network In another example, safety-critical applications, such as remote surgeries performed by health care providers, may require a guaranteed level of availability not only to be seen, but also to be given command and control over the electronic devices that are being seen by the camera or in receipt of instructions from IT Data Software programs from multiple vendors. These types of services are known in the art as inelastic because any more bandwidth than required is unused, and any less will render the service nonfunctioning.

FSA 1063 communicates with PA 1062 to assign the industry standard or custom protocols. PA 1062 stores signaling rules used to convey deliver transmissions to service devices. Signaling rules include, for example, format and relative timing of signal exchange between devices. PA 1062 also includes a protocol converter means for translating the protocols of a received signal to a new protocol for transmission in the dynamically allocated frequency spectrum. This allows service devices to transmit and receive spectrum using newly or dynamically selected protocols. The protocol allocation block also enables aggregator 1020 to transmit and receive properly formatted digital signals between service devices. A preferred type of protocol supported by this sub-module is traditional internet protocol. Other types of protocols, including proprietary protocols, are employed as well.

PA 1062 computes an efficient arrangement of protocol channels. By multiplexer (not shown) one or more signals are combined into a single channel with different frequency transmission band settings. For example, NTSC, IP data, and POTS may be arranged and multiplexed on a common twisted pair wire each having different spectrum allocation settings and protocol sequencing. PA 1062 includes signaling rules established by control signals, preconfigured settings, or GCI 1064.

GCI 1064 is displayed on a video monitor of a digital processing machine and is adopted to receive input from a user and/or administrator. GCI 1064 is a sub-module of FMM 1060, and provides means for a user and/or an administrator to assign and set the various protocols and frequency assignments. GCI 1064 may also enable users and administrator to input protocol requirements and available or unused spectrum information, and to populate FSA 1063 with QoS requirements for signal transmission. FSA 1063 updates QoS requirements automatically or selectively to provide strategic allocation of frequency bands to satisfy a particular QoS. Some examples of selectively applied QoS requirements are based upon known standards, such as those provided for TCP/IP including variable bit rates and constant bit rates. Another example of known standards are those provided by IEEE 802.11 (e.g., Wi-Fi), developed by working group 11 of the IEEE LAN/MAN Standards Committee (IEEE 802). Once populated, FSA 1063 selectively employs the specified QoS requirements when allocating frequency spectrum.

Users may also selectively populate QoS requirements based upon system objectives. For example, assume an object of the system is to provide less than a two percent rate of signal loss for a particular service category. Further, assume that such service is allocated a channel from 5 megahertz to 7 megahertz. Assuming further that lower frequencies translate to improved signal strength, when FSA 1063 observes degradation in the signal resulting in greater than two percent data loss, then FSA 1063 reallocates the service in a frequency ranging from 5 megahertz to 6 megahertz. Alternatively, if a specific harmonic causes crosstalk in a channel, FSA 1063 reallocates the channel in a higher frequency.

The foregoing has broadly outlined certain objectives, features, and technical advantages of the present invention and a detailed description of the invention so that embodiments of the invention may be better understood in light of features and advantages of the invention as described herein, which form the subject of certain claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages is better understood from the following description when considered in connection with the accompanying figures. It is to be expressly understood, however, that such description and figures are provided for the purpose of illustration and description only and are not intended as a definition of the limits of the present invention. For example, although the example embodiments discussed herein are directed to communication, security, and home office subsystems, it should be specifically noted that frequency allocation means, correcting circuitry means, as defined herein, may be employed to carry out the functions of several other subsystem applications including, without limitation, fire, safety, heating, ventilation and air conditioning, television, access controls, audio visual, plant equipment, communications, robotics, imaging, and medical sensor systems.

The invention claimed is:

1. A hybrid communications device enabling networking among analog and digital service devices, the device comprising:

a memory; and at least one processor coupled to the memory and configured to:

receive a plurality of incoming data transmissions, the plurality of incoming data transmissions including a plurality of analog data transmissions from at least one analog service device and a plurality of digital data transmissions from at least one digital service device, wherein the at least one digital service device each implement a unique device protocol;

match, at the hybrid communications device, each of the plurality of incoming data transmissions to first protocols to determine first instructions and a first transmission media to control the at least one analog service device or to second protocols to determine second instructions and a second transmission media to control the at least one digital service device, according to a corresponding incoming data transmission;

determine an outgoing transmission media for the corresponding incoming data transmission; and construct outgoing data transmissions to control the at least one analog service device or the at least one digital service device based on the match of the corresponding incoming data transmission to the first protocols or the second protocols.

2. The hybrid communications device of claim 1, wherein to match each of the plurality of incoming data transmissions to the first protocols or the second protocols, the at least one processor is configured to identify, from a plurality of device libraries, a matching device library that contains device protocols to control a device of the at least one analog service device or the at least one digital service device.

3. The hybrid communications device of claim 2, wherein the at least one processor is configured to receive input from a graphical user interface to enter, modify, or delete one or more of the plurality of device libraries.

4. The hybrid communications device of claim 2, wherein a device library includes a library name, a device type, a manufacture type, an interface media definition, and scheduling information.

5. The device of claim 1, wherein the at least one processor is further configured to:

dynamically allocate a frequency spectrum for the outgoing data transmissions between any of a plurality of analog service devices and any of a plurality of digital service devices based on at least one of a service type, a service demand, and a quality of service threshold for the outgoing transmission media, digital device protocols, or analog device protocols.

6. The device of claim 5, wherein the frequency spectrum is allocated based on at least one selected from a group consisting of the quality of service threshold, the service demand, and the service type.

7. The hybrid communications device of claim 1, wherein to match each of the plurality of incoming data transmissions to the first protocols or the second protocols, the at least one processor is configured to execute biometric synthetic instructions.

8. The hybrid communications device of claim 1, further comprising an amplifier configured to amplify the outgoing data transmissions to control the at least one analog service device.

9. The hybrid communications device of claim 1, wherein the first instructions to control the at least one analog service device and the second instructions to control the at least one digital service device include format and relative timing of signal exchange between the hybrid communications device and the at least one analog service device or the at least one digital service device.

10. The device of claim 1, wherein the control comprises configuring at least one selected from a group consisting of a timer, an on/off schedule, and an alert parameter for the at least one analog service device or the at least one digital service device.

11. A method for enabling networking among analog and digital service devices, comprising:

receiving a plurality of incoming data transmissions, the plurality of incoming data transmissions including a plurality of analog data transmissions from at least one analog service device and a plurality of digital data transmissions from at least one digital service device, wherein the at least one analog service device and the at least one digital service device each implement a unique device protocol;

matching each of the plurality of incoming data transmissions to first protocols to determine first instructions and a first transmission media to control the at least one analog service device or to second protocols to determine second instructions and a second transmission media to control the at least one digital service device, according to a corresponding incoming data transmission;

determining an outgoing transmission media for the corresponding incoming data transmission; and constructing outgoing data transmissions to control the at least one analog service device or the at least one digital service device based on the matching of the corresponding incoming data transmission to the first protocols or the second protocols.

12. The method of claim 11, matching each of the plurality of incoming data transmissions to the first protocols or the second protocols comprises identifying, from a plurality of device libraries, a matching device library that contains device protocols to control a device of the at least one analog service device or the at least one digital service device.

13. The method of claim 12, further comprising receiving input from a graphical user interface to enter, modify, or delete one or more of the plurality of device libraries.

14. The method of claim 12, wherein a device library includes a library name, a device type, a manufacture type, an interface media definition, and scheduling information.

15. The method of claim 11, wherein matching each of the plurality of incoming data transmissions to the first protocols or the second protocols, comprises executing biometric synthetic instructions.

16. The method of claim 11, further comprising amplifying the outgoing data transmissions to control the at least one analog service device.

17. The method of claim 11, wherein the first instructions to control the at least one analog service device and the second instructions to control the at least one digital service device include format and relative timing of signal exchange between a hybrid communications device and the at least one analog service device or the at least one digital service device.

18. A non-transitory computer-readable medium storing computer executable code enabling networking among analog and digital service devices, comprising code to:

receive a plurality of incoming data transmissions, the plurality of incoming data transmissions including a plurality of analog data transmissions from at least one analog service device and a plurality of digital data transmissions from at least one digital service device, wherein the at least one analog service device and the at least one digital service device each implement a unique device protocol;

match each of the plurality of incoming data transmissions to first protocols to determine first instructions and a first transmission media to control the at least one analog service device or to second protocols to determine second instructions and a second transmission media to control the at least one digital service device, according to a corresponding incoming data transmission;

determine an outgoing transmission media for the corresponding incoming data transmission; and construct outgoing data transmissions to control the at least one analog service device or the at least one digital service device based on the match of the corresponding incoming data transmission to the first protocols or the second protocols.

19. The non-transitory computer-readable medium of claim 18, wherein the code to match each of the plurality of incoming data transmissions to the first protocols or the second protocols comprises code to identify, from a plurality of device libraries, a matching device library that contains device protocols to control a device of the at least one analog service device or the at least one digital service device.

20. The non-transitory computer-readable medium of claim 19, further comprising code to receive input from a graphical user interface to enter, modify, or delete one or more of the plurality of device libraries.

* * * * *